July 3, 1962 T. R. FINLAYSON 3,042,050
THERMAL BARRIER
Filed Feb. 16, 1960 2 Sheets-Sheet 1
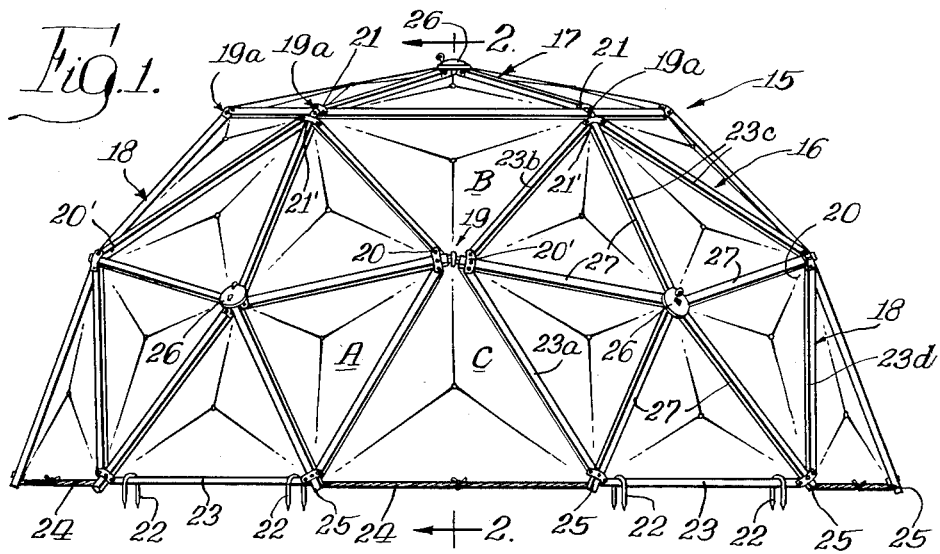
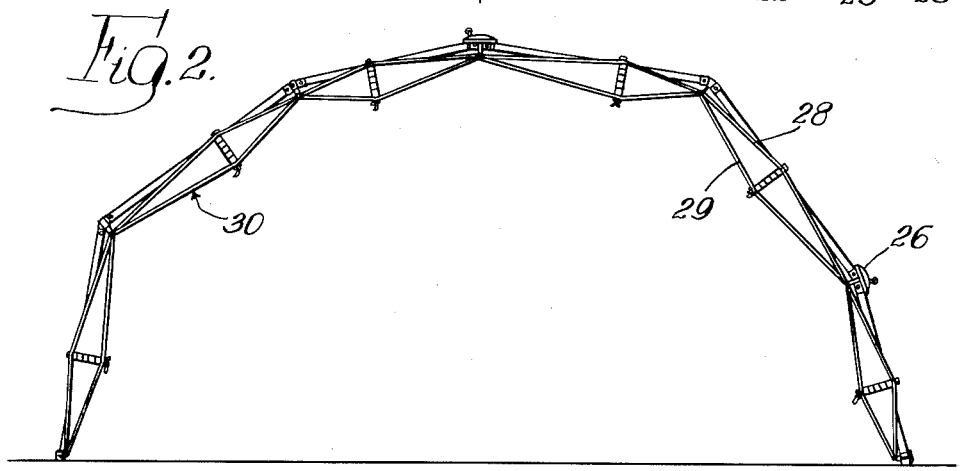
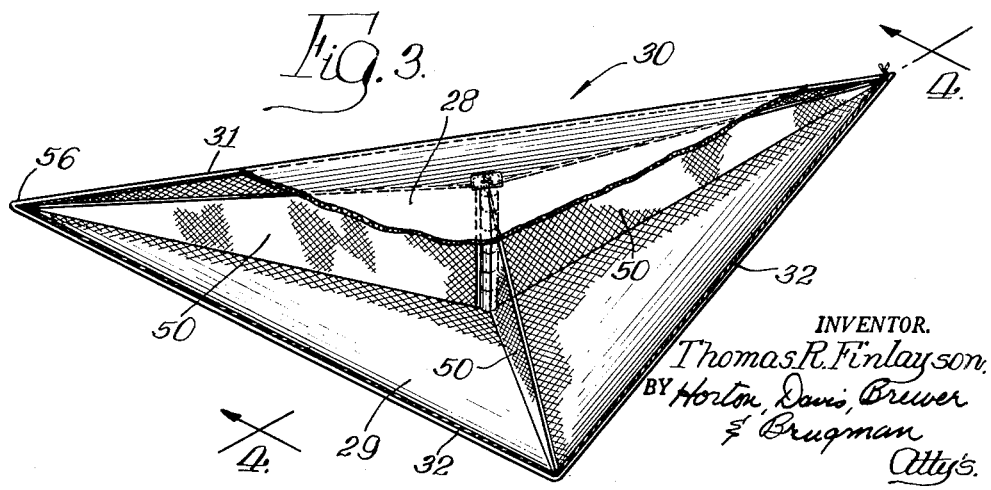
INVENTOR.
Thomas R. Finlayson.
BY Horton, Davis, Brewer
& Brugman
Atty's.

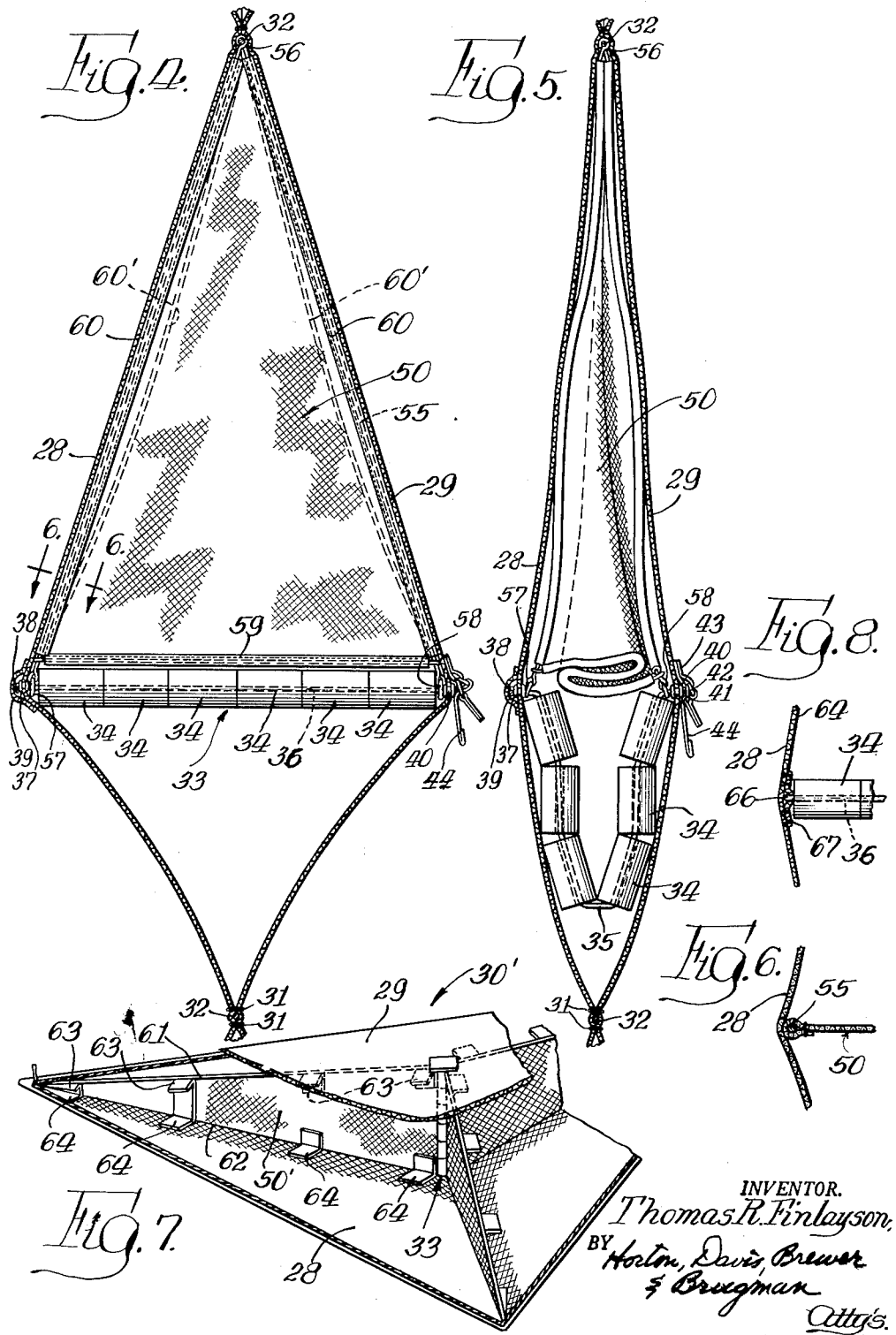

United States Patent Office
3,042,050
Patented July 3, 1962

3,042,050
THERMAL BARRIER
Thomas R. Finlayson, Milwaukee, Wis., assignor to Gleason Reel Corp., Milwaukee, Wis., a corporation of Wisconsin
Filed Feb. 16, 1960, Ser. No. 8,994
16 Claims. (Cl. 135—1)

This invention relates generally to improved insulating means, particularly thermal barriers having insulating cells and improved means for forming such cells.

Of the many materials and devices heretofore used for thermal barriers, one of the more accepted practices involves the use of air cells or spaces as a basic means for arresting the transmission of heat. Such cells desirably contain dead-air space in which the circulation of a gaseous medium, such as air, is maintained at a minimum or substantially eliminated.

One recognized way of employing cell spaces for thermal barriers entraps air between the interstices of lightweight granular materials, such as exploded formica, popcorn, asbestos wool, and the like. This is typical of the technique familiarly employed for insulating the walls of residential dwellings. Where flexible barriers or structures are involved, however, such as the walls of tents or similar temporary shelters, the use of the above noted cellular air-entrapping materials is impractical. In such cases superposed layers of lightweight flexible material are used to provide flexible barrier walls having a desired air space therebetween. When this practice is resorted to for insulating the walls of a tent, for example, the superposed fabric layers are sometimes divided into separated areas and separated by inflating such areas with compressed air or other pressurized means. This is a generally satisfactory practice, except that compressor equipment for the pressurized air is expensive, cumbersome, and unsuitable if any great degree of mobility for the tent or shelter is contemplated. A recognized solution for avoiding this last noted difficulty is found in using compressed carbon dioxide in cartridge form as the inflating source. This technique is used, for instance, to inflat rubber life rafts and life belts, etc., having air cells for buoyant purposes. The carbon dioxide cartridges, while light and mobile, nevertheless are relatively expensive and not always reliable. One of the main difficulties encountered in using the cartridge type inflation means lies in their tendency to deteriorate and lose their effectiveness over a prolonged period of time. Additionally, at low temperatures, the expansion of the gaseous medium is not as efficient as might be desired, so that full cell inflation requires additional cartridges, while in high temperature zones or in rarified atmospheres the expansion of the gaseous media may render the cartridge dangerous and result in overinflating the insulating cells. In any event, the foregoing and other difficulties have been encountered in sufficient frequency to warrent seeking an improved means for providing air cell thermal barriers in flexible wall structures. Particularly, means have been sought whereby the walls of insulating air cells may be separated without using inflation means. The present invention seeks to meet this need.

In brief, this invention provides an air cell by separating flexible wall elements of the cell mechanically. By way of illustration, it is contemplated that the flexible walls of a tent or like portable shelter will be constructed of superposed fabric layers periodically joined in a quilted pattern to define separate cell areas which form an efficient insulation barrier. According to this invention, the flexible walls of each cell are separated by mechanical means comprising an articulate device which is normally collapsed within the cell, but which is capable of being selectively actuated to form a rigid separating means extending substantially transversely between the cell walls, keeping them apart. In their separated condition, the walls of the cell contain a volume of substantially dead or stagnant air, as desired. To retard circulation in such a cell, the invention also contemplates collapsible barrier means between the cell walls; such being erected with operation of the separation means to effectively divide the major air cell into minor subcells. Locking means are optionally provided to hold the separating means in its cell-forming condition and thereby prevent collapse of the cell until desired.

A cell structure of these characteristics has obvious utility and constitutes a marked improvement over previous cell devices of this general class, particularly inflatable cells, since the mechanical separating means of this invention is not dependent on pressurizing a cell-inflating medium.

The main object of this invention is to provide an improved thermal barrier means comprising an air cell.

Another important object is to provide a mechanical means for separating the walls of an insulating cell.

Another object is to provide improved thermal barrier means, as aforesaid, in which superposed walls of the barrier are mechanically separated at selected areas to provide air cell insulation means.

A further object of this invention is to provide an improved thermal barrier means embodying a plurality of air cells, each cell being formed between superposed layers of flexible barrier material which are separated at selected defined areas by a mechanically operated means.

A still additional object of this invention is to provide improved collapsible air cell means for use in flexible thermal barriers in which the cell means are baffled into a plurality of minor subcells.

Still another important object of this invention is to provide an air cell for thermal barriers as aforesaid, in which baffle means subdividing the air cell operate with and in response to a cell-forming mechanism.

The above and other objects, features, and advantages of this invention will appear from time to time in the description of preferred and modified embodiments thereof illustrated in the accompanying drawings.

In the drawings:

FIGURE 1 is a front elevational view of an illustrative shelter structure employing a collapsible weather wall or cover means embodying a thermal barrier with air cells according to this invention;

FIG. 2 is a cross-sectional view of the structure seen in FIGURE 1, taken at line 2—2 therein and looking in the direction of the arrows thereon;

FIG. 3 is an enlarged perspective view with parts therein broken away to illustrate the internal structural features of an air cell according to this invention, including a first system of internal baffles therefor;

FIG. 4 is a cross-sectional view taken substantially at line 4—4 of FIG. 3;

FIG. 5 is a cross-sectional view similar to FIG. 4, showing the cell structure thereof in a collapsed state;

FIG. 6 is an enlarged partial cross-sectional view taken at line 6—6 of FIG. 4 looking in the direction of the arrows thereon;

FIG. 7 is a partial perspective view similar to FIG. 3, showing a modified cell according to this invention which includes a modified means for internally baffling the same into subcells; and FIG. 8 is an enlarged partial cross-sectional view illustrating a modified mounting for the mechanical cell separating means of FIGS. 4 and 5.

Turning now to the drawings, FIGS. 1 and 2, I have therein shown a typical portable shelter 15 of semispherical geodesic form having flexible weather walls or cover means, indicated generally at 16, and which comprise the thermal barrier means of this invention. More particularly, the type of shelter 15 illustrated is generally formed of a plurality of interconnected discrete polyhedral-like structural frame units, such as a single polyhedral-like roof unit 17 supported on a plurality of pentahedral-like wall units 18, 18. The several wall units 18 are articulately interconnected by junction means 19 at opposing lateral corners 20, 20' of their base peripheries, while each base corner 21 of the roof unit 17 is likewise articulately joined, through similar junction means 19a, to a single juxtaposed base corner 21' of a side wall unit 18. The side wall units are normally positioned in a substantially upright condition to undersupport the roof unit 17 in a substantially horizontal position, and plural anchor means 22, 22 are optionally mounted over certain peripheral struts 23 of the wall units to hold the associated framework to the ground or other supporting base. Added rigidity is given the framework by stringing flexible cable means 24 between separated and opposing ground-engaging base corners 25, 25 of adjacent side wall units 18, 18. The resulting frame provides a superposed dome-like support over the cover 16 which is suspended inside of the frame by any suitable means such as connective tie ropes passing through hub member 26 of the frame units.

Each of the several structural units 17 and 18 comprises a hub member 26 located centrally of a plurality of end-to-end, intersectingly related peripheral struts, such as 23, 23a, 23b, 23c, and 23d of the several side wall units. The peripheral struts, in turn, are connected to a hub 26 by intervening linear radial struts 27; one extending between each corner or intersection of the peripheral struts in the base polygon for the unit and the central hub 26 thereof. Further, while the several frame units are shown as polyhedral-like structure units, in which the hub, peripheral and radial struts lie in a common plane also may be used.

For a further and more detailed description of a geodesic shelter structure according to the foregoing general description, reference may be had to my copending application Serial No. 744,517, filed June 25, 1958, now U.S. Patent No. 2,962,034 issued November 29, 1960 and titled Shelter and Method of Making Same. In the present matter, it will be understood that while the improved thermal barrier means of this invention is illustrated and described with a geodesic shelter structure, its features and utility are not so limited. Be that as it may, portable structures of the character shown in FIGS. 1 and 2 use flexible side walls as presented by the closure skin or cover 16, and so are aptly suited to the present invention. When this type of shelter structure is erected in climates of extreme temperatures, such as the arctic or the tropics, for example, insulation of the shelter side walls becomes particularly desirable.

As seen in FIGS. 1 and 2, the side wall covering 16 embodies two or more superposed layers 28 and 29 (see FIG. 2), made of flexible material, such as a rubberized, waterproof fabric, plastic sheeting, or the like. These superposed layers are suitably stitched or otherwise interconnected along seams in a quilted pattern preferably according to the triangular areas or divisions presented by the triangular openings defined between struts in the frame units 17 and 18. These areas are indicated by the letters A, B, and C in FIG. 1. It is to be recognized, however, that it is not essential or even necessary to the concepts and accomplishments of this invention that these quilted areas necessarily be triangular. They may be of such shape as is convenient or dictated by the particular circumstances of use. As a result of quilting the superposed walls or layers of the cover member 16 in the shelter illustrated, however, a plurality of triangular cell areas is provided. When the superposed walls or fabric layers of such cell areas are suitably separated in accordance with the present invention, air cells 30 (see FIG. 3) are defined therebetween to serve as an insulating thermal barrier, according to known heat transmission characteristics and properties of air spaces.

While double wall coverings of the general character of member 16, including separated pockets inflatable with pressurized air or gases, have been known before, means for mechanical separation of the cell walls is new with this invention.

With special reference now to FIGS. 3–5 of the drawings, the features of a first preferred form of insulating cell 30 for use in forming an improved thermal barrier means is therein set out. Since the features of each cell are alike, there is no need herein for describing more than the single cell illustrated. As previously related, each cell comprises two walls, formed by the fabric layers 28, 29, with the area of each cell being defined according to rows of stitching 31 (see FIG. 4). Added peripheral strength and definition are given to the several cells by running the stitching rows 31 along opposite sides of a bead material 32.

In order to form the desired air cell it is necessary to separate the walls or layers 28 and 29, as by separating means 33. In the particular embodiment shown, means 33 comprises a plurality of articulately interconnected or joined separator elements, herein shown as cylindrical spools 34, although this exact form is not essential to the working of the separating means. The several spools are formed with central axial openings for passage of a flexible actuator member 36, shown herein as a pull rope or chain (FIGS. 4 and 5). One end of the pull rope 36 is suitably affixed to a central apex point or location of the triangular cell wall formed by fabric layer 28 (FIGURE 5) and the other end is free for manual engagement as will presently appear. Fixing the one end of the pull rope 36 is conveniently accomplished by using a grommet means 37 mounted in an opening formed in the cell wall 28; the pull cord being passed therethrough and knotted therebeyond as at 38 to prevent its withdrawal. The knotted outer end of the pull rope is desirably covered over with a weather patch 39 or other sealing means to prevent the barrier or shelter cover 16 from leaking. The opposite end of the pull rope, axially beyond the row of cylindrical actuator spools 34, passes through the cell wall 29 via a second grommet means 40 and is thereafter optionally passed through a suitable locking means such as a pair of conventional D rings 41, 42 which grip the pull rope 36 and prevent its unwanted axial displacement relative to the members 34.

Rings 41, 42 are held to the outer face of wall member 29 by suitable loop means 43 sewn or riveted in place, so as to locate the rings over the grommet 40. The pull rope 36 passes through both D rings and is trained around the outermost ring 42 and back through the underlying ring 41 in a known manner. In this regard it is preferable that the inner D ring 41 be slightly larger than the outer ring 42 to accommodate the reentrant passage of the pull rope 36. This arrangement of the two rings effectively binds the pull rope to prevent its withdrawal until desired, while at the same time permitting movement of the rope therethrough in response to pulling on its free end. A suitable pull tab 44 is also provided on the inner D ring 41 to raise the latter ring and release its binding engagement with the pull rope when it is desired to collapse the actuator or separating means.

With the foregoing arrangement the articulately related spools 34 (there being six illustrated in the embodiment shown in FIGS. 4 and 5 for example) are adapted to be moved from their normal collapsed, disjointed and misaligned condition of FIG. 5 into end-to-end axial abutment by merely pulling on the free end of rope 36. This serves to draw said spools into alignment coaxially about the rope as a rigid separating member extending between the then flexed wall members 28 and 29. Thus an air cell embracing a dead-air space is mechanically formed. By so separating the walls 28, 29 the flexible material thereof is placed in tension to compressibly load the several spools in opposing axial directions. This, under normal conditions, is sufficient to tightly hold the spool means 34 in coaxial abutment as described until some outside force disturbs their alignment. As a safety measure, however, a locking device such as the pair of D shaped rings 41 and 42 is provided so as to avoid unwanted collapse of the cell and separating means.

In order to further enhance the efficiency of the thus mechanically formed air cell 30, it is further contemplated within the scope of this invention that a system of internal baffling be provided; such baffle system being collapsible with collapse of the air cell and the mechanical separating means 33. To this end, as shown best in FIGS. 4–8 of the drawings, each cell is equipped with a plurality of pennant-shaped baffle members, indicated generally at 50 in FIG. 4, and each preferably comprising a substantially triangular-shaped flexible member of fabric, plastic, or other like material. In the particular triangular cell 30 illustrated and described herein, three such baffle pennants 50 are provided, and as seen in FIG. 3, for instance, the same separate each major triangular air cell into three minor subcells when in place. For example, the baffle pennants extend from the centrally disposed cell actuating on separating means 33 to the three vertices of the triangular air cell 30. Since the pennants are flexible they are readily stretched in a generally upright operating state between the cell walls 28 and 29 as shown in FIG. 3, or collapsed (FIG. 5), with and according to the respective cell-forming and cell-collapsing alignment of the separating means 33.

To conveniently accomplish this functioning each baffle or pennant member is desirably equipped (as best seen in FIG. 5) with reinforcing bead means 55 attached to and forming its border periphery and preferably comprising a rope or the like. Such bead means 55 is suitably secured as at 56, for example, to the apex or corner of the major triangular air cell as by sewing the same in place or, as illustrated, by passing the bead means 55 around the reinforcing cord 32 which defines the border of the major air cell.

The base leg portion of bead means 55 which extends between the longer sides of the triangular pennant 50 (see FIG. 4) carries ring means 57 and 58 through which the pull cord 36 passes; such rings being located between the opposite axial ends of the several separating spool members 34 and the cell walls 28, 29. As a result of this arrangement, tensioning of the pull cord 36 to align the several spools 34 in coaxial abutment also serves to stretch the base leg or edge portion 59 of the baffle means 50, bringing the same parallel to the then aligned separating spool means. Thus the baffle means is erected across the air cell 30. In a like manner the other pennants 50 are brought to their upright condition in the cell and with, and by means of, the cell separating means 33.

In the foregoing manner the major air cell defined by the interior of the triangular cell walls 28, 29 is effectively broken into three minor subcells by the baffle members 50, 50. These baffles effectively prevent or lessen air circulation within the major air cell, thereby increasing the latter's efficiency.

As shown particularly in FIG. 4, tensioning of the outer fabric layers or walls 28, 29 at the formation of the major air cell by positioning the separating means 33 as illustrated, forces the longer side edges 60, 60 of the triangular pennants to catenary positions, tightly tensioned against the inwardly bowed cell walls 28, 29. This is indicated by dotted lines at 60′ in FIG. 4. This latter feature provides a fairly tight seal between the edges of the baffle pennants and their lines of engagement with the cell walls to deter air movement. Additionally, the several pennants lend structural rigidity to the air cells by giving support to the separated walls 28 and 29.

In addition to the above described system for positioning the baffle members 50, a modified baffle system is contemplated, as illustrated in FIG. 7, for instance. As seen therein, a modified air cell 30′ is fitted with triangular baffle pennants 50′, 50′ which are secured at spaced points along their upper and lower edges 61 and 62 respectively by plural tab elements 63 and 64. The tab elements are sewn or otherwise attached to the baffle pennants and the inside face of the cell walls 28, 29. With this arrangement separation of the walls of the cell upon operation of separating means 33, raises the baffle pennants and tensions the same generally transversely across the cell.

A modified means of mounting the operating cord means 36 for the cell is also shown in the modified cell 30′ and detailed in FIG. 8. Such modification eliminates the need for the previously described grommet 37 of cell 30, its related opening in wall 28 and the cover cap 39. This is accomplished by affixing the one rope end to a suitable retention loop 66 sewn or otherwise affixed within the cell to the inside face of the wall 28. The wall member 28 being the outside or exterior skin of the double wall shelter cover is thereby given added watertight integrity.

In addition to the foregoing described triangular cells 30 or the modified cells 30′, other forms and shapes of cells, particularly as to geometrical pattern and profile, may be effected readily according to the expedients and teachings of the present invention. For example, it is quite obvious that four, five, six, or more sided cells, as distinguished from the three sided or triangular cells above described, and each including internal baffles, if desired, may be constructed according to the concepts heretofore set out.

It is further to be understood and regarded that while the herein described cell is preferably internally baffled by flexible pennant members or the like, additional baffle means may be employed to further divide the subcells, if desired. Also, the entire internal baffling system may be eliminated, relying on the major air cell for the thermal barrier means. In any event the intent, scope and concepts of the present invention are independent of the number, kind, or nature of the baffles in the herein described embodiments of the invention, and it is fully intended that any such variations be regarded as obvious modifications of the present invention. Also, while I have shown and described my invention in preferred and modified forms, it is to be recognized that numerous changes, modifications, variations and substitutions of materials and structures can be made therein without necessarily avoiding the purposes and teachings of my invention. As a consequence it is not my intention that I be limited to the particulars of the thermal barrier means herein shown and described, except as may appear in the following appended claims.

I claim:

1. A thermal barrier comprising, collapsible cell means having superposed flexible walls, articulate means for mechanically collapsing and separating said walls and correspondingly collapsing and forming said cells means as selected, and collapsible baffle means operably positioned by said articulate means to extend between said superposed walls with the formation of said cell means to divide the interior thereof into subcells.

2. A collapsible thermal barrier comprising, a pair of superposed walls of flexible material, means interjoining said walls at the boundaries of selected cell areas thereof, and articulately collapsible separating means mounted between said walls at each of said cell areas and adapted to be selectively erected to hold said walls separated.

3. The combination as set forth in claim 2, including means operable exteriorly of the said cell walls for selectively erecting and collapsing said separating means.

4. A collapsible cell in a flexible barrier, comprising, superposed coextensive wall members of flexible material enclosing the cell, collapsible articulate means mounted between said wall members, and means operable exteriorly of the cell for selectively erecting and rigidifying said collapsible means substantially transversely between said wall members for holding the same separated.

5. The combination as set forth in claim 4, including collapsible baffle means between said walls which are joined to and erected with and by said collapsible means to divide the interior of said cell into plural subcells.

6. An insulating cell for a thermal barrier comprising, superposed coextensive walls of flexible material, articulate collapsible separating means disposed between said walls, actuator means operable exteriorly of said walls for erecting said separating means to separate said walls, and means to lock said separating means in wall separating condition.

7. The combination as set forth in claim 6 in which said separating means comprises a plurality of articulately related members adapted to be aligned by said actuator means in coaxial abutting relation between said walls to thereby tension the latter, the tensioning of said walls serving to compressibly load said members to hold the same in their said aligned abutting relation.

8. An insulating cell for a thermal barrier, comprising a pair of superposed coextensive wall members of flexible material, means interjoining said wall members at their peripheries, and means between said wall members for separating the same comprising, a plurality of spool members having central axial openings, and a flexible member passing through said openings and articulately relating said spool members; said flexible member being attached at one end to one of said wall members and passing through an opening in the other of said wall members whereby tensioning said flexible member coaxially aligns said spool members between said wall members to force the latter apart and tension the same, the tensioning of said wall members serving to hold said spool members in coaxial alignment.

9. An insulating cell for a thermal barrier, comprising, a pair of superposed coextensive wall members of flexible material, means interjoining said wall members at their peripheries, means between said wall members for separating the same comprising a plurality of spool members having central axial openings, and a flexible member passing through said openings and articulately relating said spool members; said flexible member being attached at one end to one of said wall members and passing through an opening in the other of said wall members whereby tensioning said flexible member coaxially aligns said spool members between said wall members to force the latter apart under tension, the tensioning of said wall members serving to hold said spool members in coaxial alignment, and a locking device selectively operable to hold said flexible member and prevent unwanted movement of said spool members from their said coaxial alignment.

10. In a collapsible barrier, collapsible cell means enclosed by superposed flexible walls, mechanically operable articulate means collapsible within said cell means and adapted to be rigidified and erected therewithin for holding the said walls thereof spaced apart, and means operable from outside the cell means for selectively rigidifying and collapsing said articulate means.

11. A flexible thermal barrier comprising, a collapsible cell having superposed flexible walls, actuator means comprising an articulate, collapsible mechanism adapted to be erected between said walls to hold the latter separated in definition of a cell space receptive of a gaseous medium, and foldable baffle means erected across said cell space by and with the erection of said actuator means to deter circulation of the gaseous medium therewithin; said baffle means being collapsible with and by said actuator means.

12. The combination as set forth in claim 11, in which said baffle means includes flexible peripheral means adapted to be tensioned by the erection of said actuator means for supporting the separated walls of said cell.

13. A foldable barrier comprising collapsible cell means composed of superposed, peripherally interjoined layers of flexible fabric; and selectively collapsible separator means mounted between said layers and operable to hold the latter tensioned apart; said separator means having a plurality of articulately associated elements and means for selectively unifying said elements from outside the cell means to form a rigid structure extending centrally between and forcing said layers apart.

14. A foldable barrier comprising, superposed layers of flexible material, means interjoining said layers to define separated cell areas therefrom and collapsible separator means mounted between the said layers of each said cell area for separating and holding the same apart under tension including plural articulately related separator elements adapted to be indiscriminately and disjointedly related when said separator means is collapsed, and selectively operable actuator means for unifying said separator elements in coaxial end-to-end relation between said layers to tension the latter apart.

15. In a foldable barrier composed of superposed fabric layers, a plurality of collapsible air cell means, each formed between superposed and peripherally interjoined portions of the fabric layers; and collapsible separator means selectively operable to hold said layer portions apart under tension for erecting each said cell means comprising a plurality of separator elements, and actuator means articulately joining said elements and operable to selectively align the same in coaxial engagement to form unified means extending rigidly between said layer portions.

16. A collapsible barrier comprising superposed layers of flexible material, means interjoining said layers along boundaries definitive of cell areas, and means for separating the said layers between the boundaries of each cell area to form a three-dimensional cell space therebetween; said separating means comprising plural articulately related linear elements, and means for selectively arranging said elements in coaxial abutting alignment to form a linear unified means transfixed between the fabric layers.

References Cited in the file of this patent

UNITED STATES PATENTS

| | | |
|---|---|---|
| 1,846,496 | Mills | Feb. 23, 1932 |
| 2,575,758 | Herd | Nov. 20, 1951 |
| 2,828,755 | Stockman | Apr. 1, 1958 |
| 2,914,074 | Fuller | Nov. 24, 1959 |
| 2,918,992 | Gelsavage | Dec. 29, 1959 |
| 2,934,075 | Richardson et al. | Apr. 26, 1960 |